United States Patent
Vargas Martinez et al.

(10) Patent No.: US 11,595,409 B2
(45) Date of Patent: Feb. 28, 2023

(54) METHOD FOR MONITORING AN INDUSTRIAL NETWORK

(71) Applicant: Robert Bosch GmbH, Stuttgart (DE)

(72) Inventors: Cyntia Vargas Martinez, Karlstadt (DE); Birgit Vogel-Heuser, Garching (DE); Julien Rausch, Gemuenden (DE)

(73) Assignee: Robert Bosch GmbH, Stuttgart (DE)

( * ) Notice: Subject to any disclaimer, the term of this patent is extended or adjusted under 35 U.S.C. 154(b) by 447 days.

(21) Appl. No.: 16/792,788

(22) Filed: Feb. 17, 2020

(65) Prior Publication Data

US 2020/0280570 A1 Sep. 3, 2020

(30) Foreign Application Priority Data

Feb. 28, 2019 (DE) ............... 10 2019 105 135.5

(51) Int. Cl.
*H04L 9/40* (2022.01)
*H04L 67/12* (2022.01)

(52) U.S. Cl.
CPC .......... *H04L 63/1416* (2013.01); *H04L 63/20* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 2008/0126377 | A1* | 5/2008 | Bush | G06F 21/552 |
| 2009/0271504 | A1* | 10/2009 | Ginter | H04L 63/02 |
| | | | | 709/220 |
| 2016/0034809 | A1* | 2/2016 | Trenholm | G06N 3/0454 |
| | | | | 706/20 |

* cited by examiner

*Primary Examiner* — Kevin T Bates
*Assistant Examiner* — Emad Siddiqi
(74) *Attorney, Agent, or Firm* — Maginot, Moore & Beck LLP

(57) ABSTRACT

A method monitors an industrial network. The industrial network is divided into at least two hierarchical levels each with a different hierarchical stage. At least one network component is respectively included for each hierarchical level. Each hierarchical level has at least one segment. Each segment comprises at least one network component of the respective hierarchical level. At least one component monitoring unit for monitoring at least one network component in the respective segment and/or at least one communication monitoring unit for monitoring communication in the respective segment is/are respectively included for each segment. A central monitoring unit is included in one of the segments in order to evaluate information for detecting attacks. At least one decentralized monitoring unit is respectively included in at least one of the other segments.

11 Claims, 3 Drawing Sheets

METHOD FOR MONITORING AN INDUSTRIAL NETWORK

This application claims priority under 35 U.S.C. § 119 to patent application no. DE 10 2019 105 135.5, filed on Feb. 28, 2019 in Germany, the disclosure of which is incorporated herein by reference in its entirety.

The disclosure relates to a method for monitoring an industrial network and to a computing unit and a computer program for carrying out said method.

BACKGROUND

So-called industrial networks can be used to network a multiplicity of different components of an industrial installation to one another in order to operate such an installation in an automated manner, for example, or to monitor it with the aid of remote computing units. For this purpose, the industrial network can be organized according to the so-called automation pyramid. According to such an automation solution or automation pyramid, the network is organized in different hierarchical levels or different network components and the functions carried out by these components define different hierarchical levels.

One of these levels is the so-called field level on which the actual production or processing process takes place, in particular. This field level is usually the hierarchically lowest level. The field level describes mechanical, electrical, hydraulic, pneumatic or similar components, for example generators, motors, drives. The field level also comprises field devices which are directly integrated in these components of the production installation and are needed to control or regulate these components of the production installation. In this case, the field level comprises, in particular, field devices, for example sensors, actuators, drives, probes, buttons and switches.

These field devices of the field level can be connected to controllers on a control level superordinate to the field level, for example to programmable logic controllers (PLC). Sensors of the field level can forward captured data to these controllers or the controllers can transmit control signals to the actuators of the field level.

Controllers of the control level can in turn be connected to computing units on a superordinate supervisory level. These computing units of the supervisory level can act, in particular, as a man-machine interface and can be used, for example, to display measurement data and therefore to visualize and monitor the production or processing process carried out on the field level. For example, alarm messages or other notifications can also be output to users by means of the computing units on this level.

Computing units of the supervisory level are in turn connected to computing units on a superordinate operational and control level which can be used to create, monitor and carry out operating procedures. For example, this operational and control level can comprise PCs, servers or the like. The enterprise level is in turn superordinate to the operational and control level and is usually the hierarchically highest level on which organization, planning and management of the entire installation take place.

In order to be able to ensure security and know-how protection, it is important to be able to monitor such industrial installations and industrial networks for attacks.

SUMMARY

The disclosure proposes a method for monitoring an industrial network and a computing unit and a computer program for carrying out said method having the features of the independent patent claims. The subclaims and the following description relate to advantageous configurations.

The industrial network comprises a multiplicity of network components. In particular, components of an industrial installation are networked to one another by means of the industrial network.

The network is divided into at least two hierarchical levels each with a different hierarchical stage, wherein at least one network component is respectively provided for each hierarchical level. These levels may comprise, for example, a field level, a control level, a supervisory level, an operational and control level and an enterprise level. Network components of the individual hierarchical levels may be of a different nature and may be in the form of sensors, actuators, control devices, programmable logic controllers, PCs, servers, smart devices etc., for example.

Each hierarchical level has at least one segment, wherein each segment comprises at least one network component of the respective hierarchical level. In this case, each network component of a hierarchical level is assigned to precisely one segment, in particular. At least one component monitoring unit and/or at least one communication monitoring unit is/are respectively provided for each segment.

Such a component monitoring unit ("host agent") is provided for the purpose of monitoring at least one network component in the respective segment. For this purpose, the component monitoring unit can receive and evaluate, for example, specific component-specific information from the respective network components, in particular in order to detect attacks or violations of predefined rules. In particular, the component monitoring units may independently carry out checks or audits of network components. For example, the component monitoring units may each be in the form of an antivirus unit or a unit for checking checksums. In principle, any unit may comprise software on independent hardware or on existing hardware. If attacks or rule violations are detected, the component monitoring units can generate, in particular, corresponding alarms which are forwarded to a superordinate monitoring unit for further evaluation.

Such a communication monitoring unit ("network sensor") is provided for the purpose of monitoring communication in the respective segment. For this purpose, the communication monitoring unit can, for example, passively read data traffic, for instance with the aid of network connection mirroring ("port mirroring") or with the aid of a test connection ("test access port", TAP). In particular, the communication monitoring units are not configured to themselves detect attacks, but rather transmit information relating to the data traffic to a superordinate monitoring unit for further evaluation.

A central monitoring unit is provided in one of the segments in order to evaluate information for the purpose of detecting attacks. The central monitoring unit can be expediently provided in a segment on a supervisory level or an enterprise level.

At least one decentralized or local monitoring unit ("sub-network management agent", SMA) is respectively provided in at least one of the other segments. The at least one component monitoring unit and/or the at least one communication monitoring unit in the other segments is/are each assigned to one of the at least one decentralized monitoring units.

If a decentralized monitoring unit is provided in one of the other segments, the at least one component monitoring unit and/or the at least one communication monitoring unit in this segment is/are expediently assigned to this decentralized monitoring unit.

If, in contrast, a decentralized monitoring unit is not provided in one of the other segments, the at least one component monitoring unit and/or the at least one communication monitoring unit in this segment is/are expediently assigned to that decentralized monitoring unit which is provided on the hierarchically next higher hierarchical level.

These decentralized monitoring units in the individual segments each receive first information from the assigned at least one component monitoring unit and/or the assigned at least one communication monitoring unit. This first information may be, for example, alarms or notifications from the respective component monitoring units if they detect an attack on a specific network component. Alternatively or additionally, this first information can also be information which is collected by the communication monitoring units and relates to the data traffic between the network components in the respective segment.

This central monitoring unit ("centralized security management system", CSMS) is provided, in particular, for the purpose of collecting, correlating and evaluating information from network components of all hierarchical levels. In particular, the central monitoring unit can detect attacks in the entire industrial network. If a fault is detected, the central monitoring unit can also expediently detect an extent of the corresponding attack and, in particular, can assess how dangerous the attack is for the network, for example what consequences the attack has for the industrial network, how greatly the attack will restrict the network and which components or functions of the network are affected by the attack. In this case, the central monitoring unit is, in particular, in the form of a complex system which has complex assessment and attack detection mechanisms and also has information relating to the entire industrial network, in particular.

In order to be able to detect attacks, the central monitoring unit expediently comprises a database or has access to such a database which stores reference information relating to known attacks or attack methods, with which reference information current information relating to different network components can be compared. Furthermore, the central monitoring unit can also detect, in particular, anomalies or unexpected behavior in order to also be able to detect as yet unknown attacks. For example, for this purpose, the central monitoring unit can evaluate the information with the aid of statistical analyses, machine learning ("machine learning techniques") and/or a rule-based system ("rule-based knowledge"). Besides detecting attacks, the central monitoring unit can also perform further functions, in particular, and, for example, can react to alarms or reports from further network components or can independently carry out checks or audits.

In particular, the component monitoring units and the communication monitoring units act as part of an attack detection system ("intrusion detection system", IDS), wherein the component monitoring units expediently act as a host-based IDS ("host IDS") and the communication monitoring units act as a network-based IDS ("network IDS"). Conventional IDS are usually in the form of central monitoring systems, that is to say the host IDS and the network IDS usually transmit information directly to a central monitoring unit CSMS for further evaluation and for detecting attacks. However, in hierarchically organized industrial networks, there is the risk of a communication connection from the host IDS or network IDS to a corresponding CSMS unit on a superordinate hierarchical level being able to be interrupted, for example on account of an attack, on account of maintenance or on account of a defect of the corresponding communication system. In such a case of an interrupted communication connection, only restricted attack detection or even no longer any attack detection at all may possibly be possible.

The present method provides a possible way of enabling monitoring of the entire industrial network and reliable attack detection even in the case of an interrupted communication connection to the central monitoring unit. In contrast to conventional central attack detection systems, decentralized monitoring is proposed within the scope of the present method. For this purpose, the hierarchical levels are each subdivided into at least one segment and the decentralized monitoring units are also provided.

These decentralized or local monitoring units ("subnetwork management agent", SMA) are expediently less complex than the central monitoring unit and are each intended, in particular, to collect information from the assigned component or communication monitoring units. During normal operation of the network, the decentralized monitoring units are expediently used to forward information from the individual segments to the central monitoring unit for further evaluation. However, if the central monitoring unit cannot be reached, individual or all decentralized monitoring units can at least partially undertake the functions of the central monitoring unit until the latter can be reached again.

The decentralized monitoring units each receive first information from the assigned at least one component monitoring unit and/or the assigned at least one communication monitoring unit. This first information may be, for example, alarms or notifications from the respective component monitoring units if they detect an attack on a specific network component. Alternatively or additionally, this first information can also be information which is collected by the communication monitoring units and relates to the data traffic between the network components in the respective segment. Furthermore, the central monitoring unit expediently receives information from the component or communication monitoring unit in its own segment and evaluates said information.

If there is a communication connection to the central monitoring unit, the decentralized monitoring units each transmit second information, on the basis of the respective received first information, to the central monitoring unit which evaluates this second information in order to detect attacks. In this case of fault-free communication, the central monitoring unit, in particular, carries out the evaluation in order to detect attacks in the entire industrial network.

As a result of the decentralized monitoring units and their distribution in individual segments, it is still possible to carry out attack detection in the individual segments even in the case of interrupted communication.

For this purpose, if the communication connection to the central monitoring unit is interrupted, the at least one decentralized monitoring unit itself evaluates or at least partially evaluates the respective received first information in order to detect attacks. In this case, in the event of an interrupted communication connection, decentralized local attack detection can still be carried out in the individual segments individually and independently of one another. This possibility is appropriate, for example, if communication which is at risk of attack exists between all segments of the industrial network, that is to say if the communication connections between the individual segments are at risk of potential attacks.

Alternatively or additionally, if the communication connection to the central monitoring unit is interrupted, the at least one decentralized monitoring unit can transmit second information, on the basis of the respective received first information, to a predetermined monitoring unit of the at least one decentralized monitoring unit, which evaluates this second information in order to detect attacks. In this case, this predetermined monitoring unit expediently acts as a replacement for the central monitoring unit and at least partially undertakes the tasks of the latter if the communication connection is interrupted. This possibility is appropriate, for example, if a communication connection between this predetermined monitoring unit and segments on subordinate hierarchical levels is secure and is not or is at least scarcely at risk of attack, whereas a communication connection between the predetermined monitoring unit and hierarchically superordinate segments is exposed to an increased risk of attack.

In the case of a fault-free communication connection to the central monitoring unit, the decentralized monitoring units therefore each act, in particular, as an interface between the central monitoring unit and the individual segments or the component monitoring units and communication monitoring units in the individual segments. In this case, the central monitoring unit can carry out global attack detection across the entire network. If, however, a communication connection to the central monitoring unit is interrupted, for example on account of an attack, maintenance, etc., individual or all decentralized monitoring units can locally at least partially undertake the tasks of the central monitoring unit and can carry out local attack detection, at least transitionally until the communication connection has been restored. Even though the decentralized monitoring units are not as complex as the central monitoring unit and, for example, cannot perform all of the functions of the central monitoring unit, at least a certain degree of attack detection can nevertheless be maintained by the decentralized monitoring units in the case of an interrupted communication connection. The present method therefore can enable monitoring and attack detection for the complete industrial network or each individual segment of the industrial network at any time.

In contrast to conventional central attack detection systems, the component monitoring units and communication monitoring units in the individual segments therefore, within the scope of the present method, do not transmit their first information directly to a single central monitoring unit, but rather to the respective assigned local decentralized monitoring unit which can individually react to this first information. Each hierarchical level and also each segment can therefore expediently individually react to attacks or security incidents. It is therefore expediently made possible to react locally to anomalies such as potential attacks in the individual segments by means of the decentralized monitoring unit and also to detect an extent of a corresponding attack and to react accordingly by means of the central monitoring unit.

The present method therefore proposes a decentralized monitoring system which can robustly and reliably detect attacks. In particular, as a result of the method, it is possible to achieve a high degree of stability, in particular the ability to restore fault-free operation of the network after an attack, fault or failure, and also a high degree of tolerance, in particular the ability of the network to still remain operational even in the event of an attack, fault or failure.

Furthermore, the present method requires little configuration outlay and is cost-effective and simple to operate. In particular, already existing industrial networks can be easily retrofitted to carry out the present method. The central monitoring unit, the decentralized monitoring units and the component and communication monitoring units can be easily incorporated in the industrial network, in particular, for example each as separate hardware units or as executed software. For example, such software can be executed on computing units which are already present in the network. Furthermore, the present method makes it possible to monitor the network by means of a modular system, wherein the individual modules or the individual monitoring units can also be obtained, for example, from different suppliers or third-party manufacturers.

The predetermined monitoring unit of the at least one decentralized monitoring unit is preferably provided on a hierarchically highest hierarchical level to which there is a communication connection. For example, in the case of an interrupted communication connection, it can always be respectively determined again which of the decentralized monitoring units acts as this predetermined monitoring unit. It is likewise conceivable for it to be firmly predefined or configured as to which of the decentralized monitoring units acts as the predetermined monitoring unit. The latter possibility is expediently appropriate if, for example, some segments communicate with one another securely and scarcely at risk of attack, in particular on hierarchically lower levels, and if in turn the communication of other segments is rather at risk of attack, in particular on hierarchically higher levels.

According to one advantageous embodiment, the at least one decentralized monitoring unit evaluates the received first information, expediently generates alarms if attacks are detected and forwards these alarms as second information to the central monitoring unit or to the predetermined decentralized monitoring unit, depending on the existing communication connection. This corresponding superordinate monitoring unit can evaluate these alarms further, for example in order to assess whether there is actually an attack and, if so, what specific attack there is.

Alternatively or additionally, the at least one decentralized monitoring unit advantageously processes the received first information and forwards corresponding processed information as second information. In the course of this processing, the first information can be expediently preprocessed and/or filtered. In particular, an amount of forwarded data and the computing effort needed to further evaluate the second information can therefore be reduced.

Alternatively or additionally, the at least one decentralized monitoring unit can advantageously directly forward the received first information as second information. In this case, no evaluation or processing is expediently carried out, but rather the first information is forwarded unchanged for further evaluation.

If, after an interrupted communication connection, the communication connection to the central monitoring unit has been restored, results of the respective evaluations of the first information by the at least one decentralized monitoring unit and/or of the respective evaluations of the second information by the predetermined monitoring unit are advantageously transmitted to the central monitoring unit for further evaluation. In this case, the central monitoring unit can check, verify and expediently further investigate the results, for example. If, for example, an alarm on account of a potential attack has been detected as such a result, the central monitoring unit, if it can be reached again, can check, for example, whether there is actually an attack.

The evaluation of the first information and/or the second information in order to detect attacks is respectively preferably carried out on the basis of a predefined segment-specific model. In particular, these models each describe fault-free operation of the respective segment if there is no attack, for example typical data or operating scenarios of fault-free operation. In this case, the models can comprise, for example, comparison values for data interchange, communication, requests and responses to requests between the respective network components in the segment in the course of fault-free operation. In this case, the individual segment-specific models may have different complexity, depending on the required stability and/or required tolerance. Furthermore, the complexity of the segment-specific models can depend on further predefined or predefinable criteria, for example a risk posed to the industrial network by a potential attack or a computing capacity of the individual decentralized monitoring units.

The predefined segment-specific models are preferably generated by collecting data from the respective at least one component monitoring unit and/or the respective at least one communication monitoring unit in the respective segment, for example in the course of normal fault-free operation or, for example, even during a special test or configuration mode. These collected data are preferably evaluated, preferably by means of statistical analyses and/or by means of machine learning ("machine learning techniques"), for example by means of neural networks or a support vector method ("support vector machine", SVM), and/or by means of a rule-based system ("rule-based knowledge"). These segment-specific models can be expediently generated by the central monitoring unit and can be transmitted, in particular, to the individual decentralized monitoring units or the predetermined monitoring unit. It is likewise conceivable for the individual decentralized monitoring units to create corresponding segment-specific models for the segment or segments of the component and/or communication monitoring units assigned to them and to transmit said models to the central monitoring unit.

One preferred embodiment of the method relates to a configuration of the industrial network, in particular a first-time configuration before the network is activated. The industrial network is expediently configured after the individual network components have been introduced and networked to one another.

The industrial network is preferably configured by virtue of the central monitoring unit being introduced into the network, for example as a separate hardware element or as executable software, in particular into a computing unit which is already present in the network, in particular on a supervisory level or an enterprise level.

The at least one decentralized monitoring unit is also preferably introduced into the network, for example likewise respectively as a separate hardware element or executable software, in particular into computing units which are already present. The individual decentralized monitoring units are then authenticated or registered by the central monitoring unit.

After successful authentication, the at least one decentralized monitoring unit receives, from the central monitoring unit, configuration data relating to the assigned at least one component monitoring unit and/or the assigned at least one communication monitoring unit. These configuration data can comprise, for example, security guidelines for the respective segments, for example with regard to communication etc. which is allowed in the segments. In particular, the configuration data comprise information or configurations for component monitoring units and communication monitoring units in the respective segments. The configuration data can also comprise, for example, information relating to the communication between the central monitoring unit and decentralized monitoring units. The received configuration data are expediently first of all validated by the individual decentralized monitoring units and are implemented and applied only after subsequent validation.

The at least one component monitoring unit and/or the at least one communication monitoring unit is/are then preferably introduced for each segment and is/are authenticated or registered by the assigned at least one decentralized monitoring unit. These monitoring units can also each be in the form of a separate hardware element or executable software, for example. It is also conceivable, for example, to design the component and/or communication monitoring unit and/or the decentralized monitoring unit as software in the same computing unit of the respective system in each case. After successful authentication, the decentralized monitoring units expediently each check, for each segment, whether configuration data are available for the authenticated units. If this is the case, the configuration data are expediently validated using the security guidelines for the segment.

Upon successful validation, the at least one decentralized monitoring unit preferably configures the assigned at least one component monitoring unit and/or the assigned at least one communication monitoring unit according to the configuration data.

If a fault occurs in one of the configuration steps explained above, for example because authentication or validation cannot be successfully carried out, a fault message can be output, in particular, and help from a user can be requested.

Following successful configuration of the at least one component monitoring unit and/or the at least one communication monitoring unit, the predefined segment-specific models can also be advantageously generated. For example, a special test mode can first of all be respectively carried out for each segment for this purpose, in the course of which corresponding data are collected and evaluated.

An advantageous embodiment of the method relates to the replacement of a decentralized monitoring unit, for example if this is necessary on account of a defect or a security gap. In particular, the central monitoring unit can first of all be informed of the imminent replacement in order to avoid the generation of an alarm or a fault message. For example, the alarm generation can be deactivated for the duration of a maintenance interval for this purpose.

A decentralized monitoring unit is advantageously replaced by virtue of the decentralized monitoring unit to be replaced first of all being removed from the network, for example by removing the corresponding hardware unit or deleting the corresponding software. A new decentralized monitoring unit is then introduced into the network and is authenticated or registered by the central monitoring unit. The new decentralized monitoring unit then receives, from the central monitoring unit, the configuration data relating to the respective segment. If segment-specific models already exist for the respective segment, in particular, and are stored in the central monitoring unit, these models are transmitted, in particular, to the new decentralized monitoring unit.

The disclosure also makes it possible to easily carry out checks or audits of a specific network component which are requested by a user. In particular, such a check is requested at the central monitoring unit which verifies that this check does not contravene any security guideline. After successful verification, the request is forwarded to the decentralized monitoring unit, to which the network component to be checked is assigned. The decentralized monitoring unit then triggers the check, with the result that the network component to be checked collects corresponding test data and transmits the latter to the decentralized monitoring unit. The latter then forwards the test data to the central monitoring unit which evaluates the test data and outputs a corresponding result of the evaluation to the user.

The method is suitable for a wide range of industrial networks or accordingly networked industrial installations, for example for tunnel boring machines, hydraulic punches/presses, general automation systems, semiconductor handling, robotics etc. The method is particularly suitable for machine tools, for example a welding system, a screwing system, a wire saw or a milling machine, or a web processing machine, for example a printing press (for example a newspaper printing press, a gravure printing press, a screen printing press, an in-line flexographic printing press) or a packaging machine, or a (conveyor) installation for producing an automobile or for producing components of an automobile (for example internal combustion engines or control devices).

A computing unit according to the disclosure, for example a control device of a printing press, is configured, in particular in terms of programming, to carry out a method according to the disclosure.

The implementation of a method according to the disclosure in the form of a computer program or computer program product with program code for carrying out all method steps is also advantageous since this gives rise to particularly low costs, in particular if an executing control device is also used for further tasks and is therefore present anyway. Suitable data storage media for providing the computer program are, in particular, magnetic, optical and electrical memories, for example hard disks, flash memories, EEPROMs, DVDs and many more. It is also possible to download a program via computer networks (Internet, intranet etc.).

Further advantages and configurations of the disclosure emerge from the description and the accompanying drawing.

It goes without saying that the features mentioned above and the features yet to be explained below can be used not only in the respectively stated combination but also in other combinations or alone, without departing from the scope of the disclosure.

The disclosure is schematically illustrated in the drawing on the basis of exemplary embodiments and is described in detail below with reference to the drawing.

DETAILED DESCRIPTION

Figure 1:
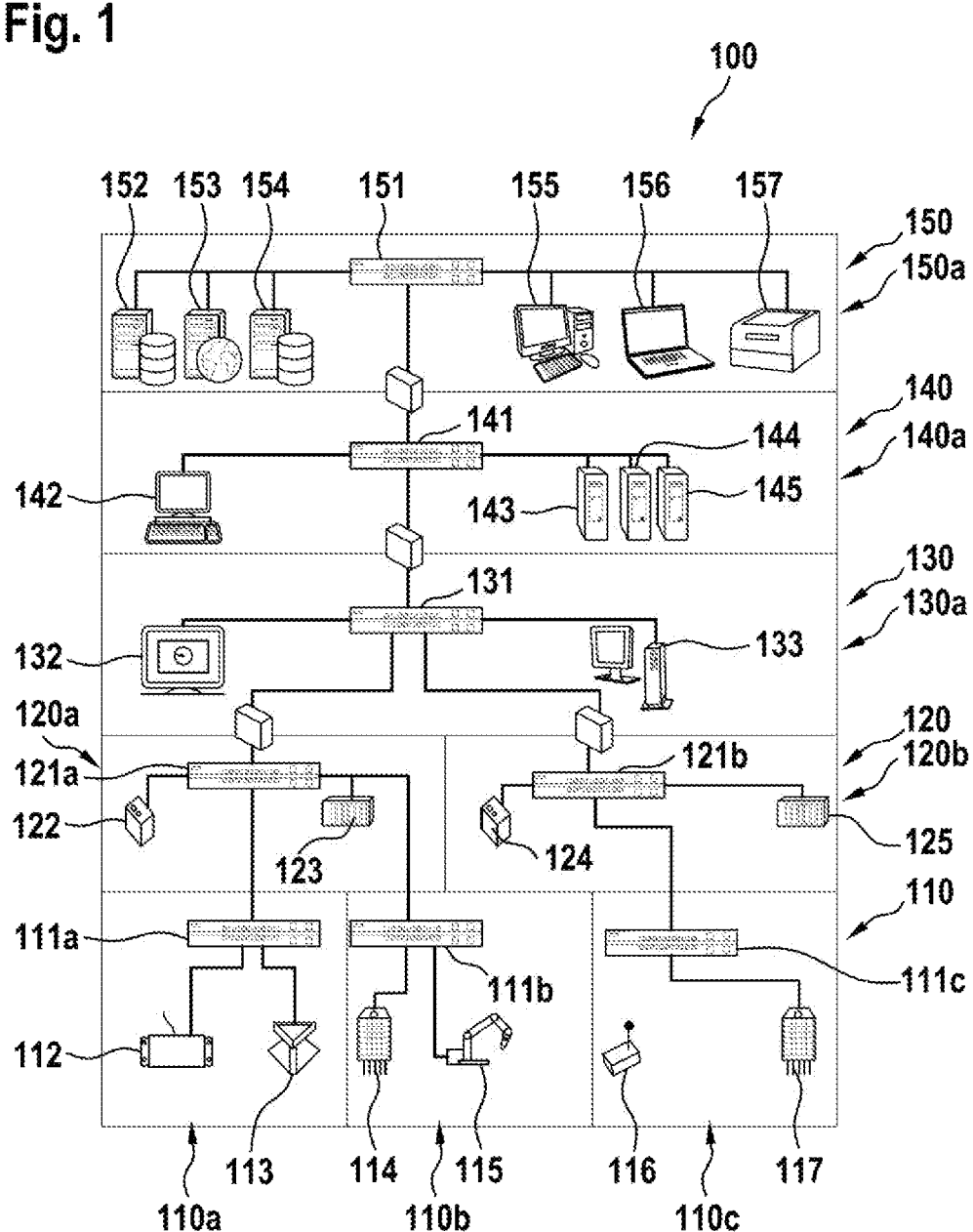
FIG. 1 schematically shows an industrial network which can form the basis of a preferred embodiment of the method according to the disclosure.

An industrial network is schematically illustrated in FIG. 1 and is denoted using 100. The industrial network 100 is used to network a multiplicity of different components of an industrial installation to one another. For example, such an installation may be a processing machine. The network may be Ethernet-based, in particular.

According to so-called automation pyramids or automation solutions, the network 100 is organized in different hierarchical levels 110, 120, 130, 140, 150, wherein a multiplicity of different network components are present on each of the hierarchical levels 110, 120, 130, 140, 150.

In the present example, a hierarchically lowest level is a field level 110 on which the actual production or processing process of the web processing machine takes place, in particular. Field devices such as sensors 114, 117, probes 112, radio-controlled switches 116 and motors or actuators 113, 115, for example for moving robot arms, are provided on this field level 110 as network or machine components, for example.

Control devices 122, 124 and programmable logic controllers (PLC) 123, 125, for example, are provided as network components on a control level 120 superordinate to the field level 110, in particular in order to control the network components on the field level 110. For this purpose, the network components of the field and control levels 110, 120 are networked via network distributors 111a, 111b, 111c, 121a, 121b (for example a so-called switch). For example, the field devices 112 and 113 are connected to the superordinate distributor 121a via a distributor 111a and the field devices 114 and 115 are connected via a distributor 111b. The field devices 116 and 117 are connected to the superordinate distributor 121b via a distributor 111c, for example.

On a supervisory level 130 superordinate to the control level 120, network components act, for example, as man-machine interfaces for visualizing and monitoring the production or processing process carried out on the field level 110. Such network components of the supervisory level 130 can comprise, for example, operating panels 132, PCs 133 etc. The distributors 121a and 121b of the control level 120 are connected to a distributor 131 of the supervisory level 130 for this purpose.

A so-called operational and control level 140 is superordinate to the supervisory level 130, on which operational and control level operating procedures can be created, monitored and carried out. Network components on this operational and control level may comprise, for example, PCs 142 and servers 143, 144, 145. For example, data relating to the production or processing process carried out on the field level 110 can be archived in such servers. The distributor 131 of the supervisory level 130 is also expediently connected to a distributor 141 of the operational and control level 140.

The so-called enterprise level 150, for example, is provided as the hierarchically highest level, on which enterprise level the organization, planning and management of the entire enterprise operating the installation take place. Network components of this enterprise level 150 are, for example, PCs 155, laptops 156, printers 157 and also, for example, remote computing units 152, 153, 154, for instance in the sense of so-called "cloud computing". A distributor 151, to which the distributor 141 of the operational and control level 140 is connected, is also provided on the enterprise level 150.

Communication between two network distributors in each case can preferably be protected by means of conventional firewall units or the like, as depicted.

For example, the network components of the field level 110, the control level 120 and the supervisory level 130 may be arranged in the same building in which the production or processing process is carried out by the web processing machine. In contrast, the network components of the operational and control and enterprise levels 140, 150 can also be arranged far away from the building of the web processing machine. Furthermore, the network components on the levels 110, 120, 130 can be networked to one another, in particular, via local wired communication connections such as field buses. In contrast, the networking to the network components of the operational and control and enterprise levels 140, 150 can also be effected, in particular, via wireless communication connections, for example via the Internet.

It goes without saying that the industrial network can also comprise further hierarchical levels in addition to the levels explained above. It is likewise conceivable for some of the levels mentioned above to not be provided or to be combined to form a common level, for example.

In order to be able to ensure security and know-how protection, the industrial network 100 is monitored for attacks as part of a preferred embodiment of the method according to the disclosure.

Within the scope of the method, each hierarchical level 110, 120, 130, 140, 150 has at least one segment, wherein each network component is expediently assigned to precisely one segment. It goes without saying that more network components can also be located for each segment, even though this is often uncommon on account of the high costs required. In particular, only one network component can also be provided, and only the most important network information can be captured.

In the present example, the field level 110 is divided into three segments, 110a, 110b, 110c, wherein the network components 111a, 112 and 113 are assigned to the segment 110a, the network components 111b, 114 and 115 are assigned to the segment 110b, and the network components 111c, 116 and 117 are assigned to the segment 110c.

The control level 120 is divided, for example, into two segments 120a and 120b, wherein the network components 121a, 122 and 123 are assigned to the segment 120a, and the network components 121b, 124 and 125 are assigned to the segment 120b. The supervisory level 130, the operational and control level 140 and the enterprise level 150 are each divided into one segment 130a, 140a and 150a, respectively, which expediently corresponds to the respective level.

Furthermore, within the scope of the method, different monitoring units are respectively provided for each segment, as explained below with reference to FIG. 2 which likewise schematically illustrates the industrial network 100 shown in FIG. 1. In this case, identical reference signs in FIGS. 1 and 2 denote identical or structurally identical elements. For reasons of clarity, not all network components illustrated in FIG. 1 are illustrated again in FIG. 2, but it goes without saying that the network 100 shown in FIG. 2 is also intended to accordingly comprise the network components shown in FIG. 1.

Figure 2:
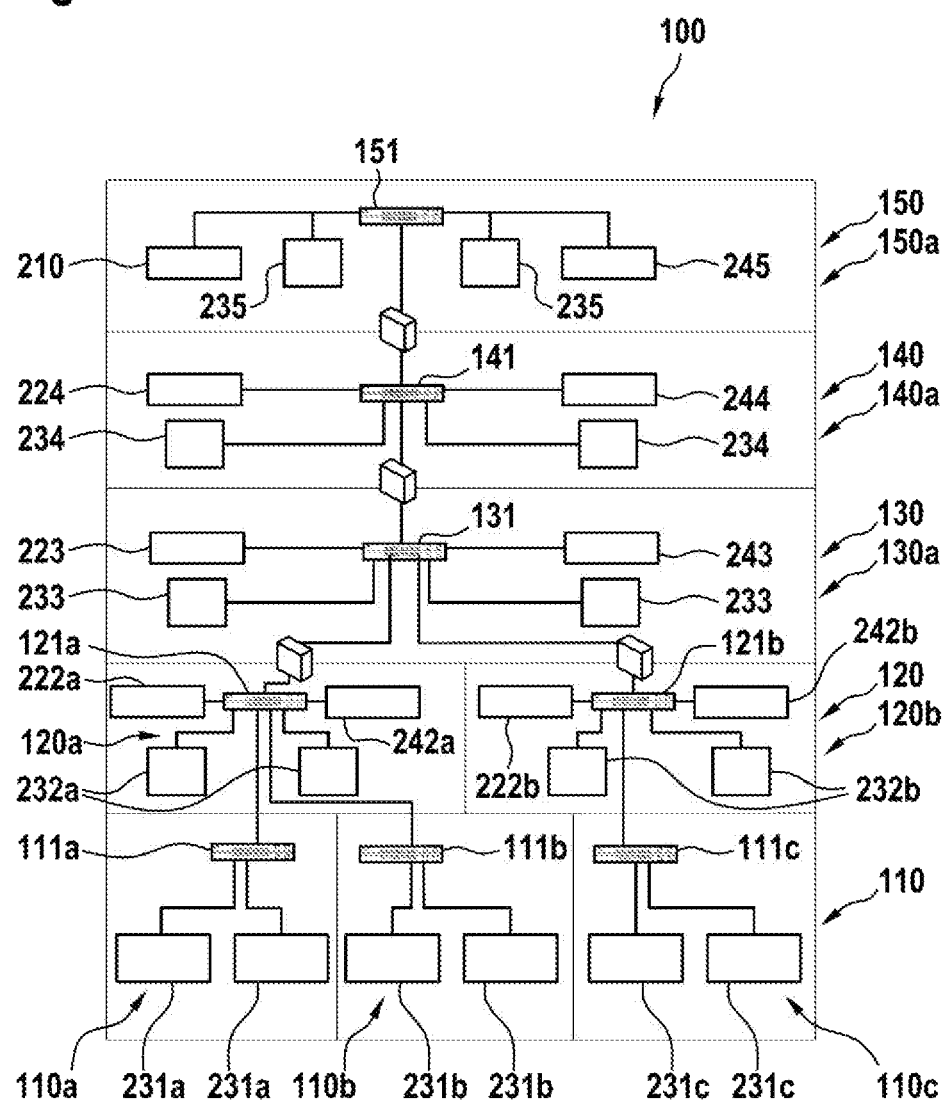
FIG. 2 schematically shows an industrial network which can form the basis of a preferred embodiment of the method according to the disclosure.

As illustrated in FIG. 2, a central monitoring unit ("centralized security management system", CSMS) 210 is provided in the segment 150a of the enterprise level 150. A decentralized monitoring unit ("subnetwork management agent", SMA) 222a, 222b, 223, 224 is respectively provided in the segments 120a, 120b, 130a, 140a. A decentralized monitoring unit is not necessarily required on the field level 110 since this information can be managed by a decentralized monitoring unit on a higher control level. However, it goes without saying that a decentralized monitoring unit can also be respectively nevertheless provided in the segments 110a, 110b, 110c of the field level 110.

At least one component monitoring unit for monitoring at least one network component in the respective segment and/or at least one communication monitoring unit for monitoring communication in the respective segment is/are also respectively provided for each segment.

For example, two component monitoring units 231a are provided in the segment 110a of the field level 110 in order to monitor the field devices 112 and 113. Accordingly, two component monitoring units 231b for monitoring the field devices 114 and 115 are provided in the segment 110b and two component monitoring units 231c for monitoring the field devices 116 and 117 are provided in the segment 110c. For example, these component monitoring units 231a, 231b, 231c can each be provided as separate hardware units which are connected to the respective distributor 111a, 111b and 111c. These component monitoring units may also be, for example, embedded software applications in the field devices 112 and 113.

Two component monitoring units 232a, for example, are provided in the segment 120a of the control level 120, wherein one of these two units 232a is provided for the purpose of monitoring the control device 122 and the other of the two units 232a is provided for the purpose of monitoring the PLC 123. Accordingly, two component monitoring units 232b are also provided in the segment 120b, for example, one unit for monitoring the control device 124 and one unit for monitoring the PLC 125. For example, these component monitoring units 232a, 232b can each be executed as software by the respective control device or the respective PLC.

Furthermore, a communication monitoring unit 242a is provided in the segment 120a and passively reads, for example, data traffic in the segment 120a, for instance with the aid of mirroring of network connections ("port mirroring") of the distributor 121a. A corresponding communication monitoring unit 242b is also provided in the segment 120b.

Accordingly, component monitoring units 233, 234, 235 for monitoring the network components in the respective segment are also respectively provided in the segments 130a, 140a and 150a and may each be in the form of executed software, for example.

Furthermore, a communication monitoring unit 243, 244 and 245 for monitoring the communication in the respective segment 130a, 140a and 150a is respectively provided in the segments 130a, 140a, 150a, which communication monitoring units each carry out, for example, "port mirroring" of the respective distributor 131, 141 and 151.

As a result of the simple incorporation of the units in the industrial network, in particular on the basis of Ethernet, communication between the units can also use established and proven methods, for example syslog. This is a standard for transmitting log messages in an IP computer network.

Within the scope of the present method, the central monitoring unit (CSMS) 210 is provided, in particular, for the purpose of collecting, correlating and evaluating information from all network components of all hierarchical levels in order to be able to detect attacks in the entire industrial network 100 and to be able to assess an extent of the corresponding attack.

In contrast, the decentralized or local monitoring units (SMA) 222a, 222b, 223, 224 are less complex than the central monitoring unit 210 and are each used to forward information from component and communication monitoring units assigned to them to the central monitoring unit 210 for further evaluation.

In addition to the component monitoring units 232a and the communication monitoring unit 242a in the segment 120a, the decentralized monitoring unit 222a in this segment 120a is in this case also assigned the component monitoring units 231a and 231b of the hierarchically subordinate segments 110a and 110b.

The component monitoring units 232b and the communication monitoring unit 242b in the segment 120b and the component monitoring units 231c in the segment 110c are assigned to the decentralized monitoring unit 222b in the segment 120b.

In the segment 130a, the component monitoring units 233 and the communication monitoring unit 243 are assigned to the decentralized monitoring unit 223 provided there. Accordingly, in the segment 140a, the component monitoring units 234 and the communication monitoring unit 244 are assigned to the decentralized monitoring unit 224 provided in this segment 140a.

If the central monitoring unit 210 cannot be reached, the decentralized monitoring units can at least partially undertake the functions of the central monitoring unit 210. Within the scope of the present method, even in this case of an interrupted communication connection to the central monitoring unit 210, the entire industrial network 100 can therefore be monitored, as shall be explained below using FIGS. 3 to 5.

Figure 3:
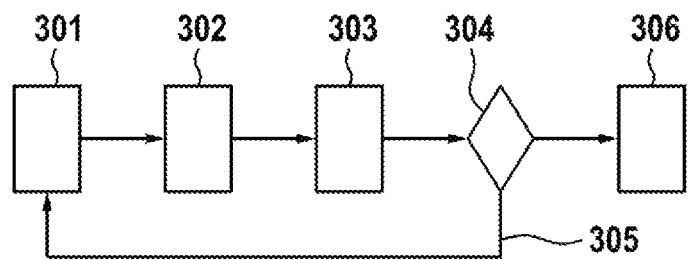
FIG. 3 schematically shows a preferred embodiment of the method according to the disclosure as a block diagram.
Figure 4:
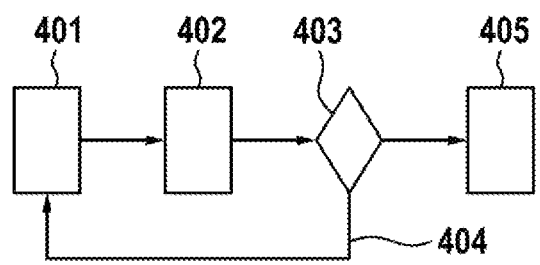
FIG. 4 schematically shows a preferred embodiment of the method according to the disclosure as a block diagram.
Figure 5:
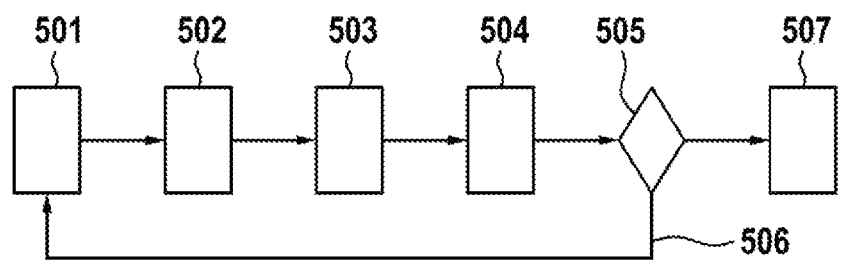
FIG. 5 schematically shows a preferred embodiment of the method according to the disclosure as a block diagram.

FIGS. 3 to 5 each schematically illustrate a preferred embodiment of the method according to the disclosure as a block diagram.

In this case, FIG. 3 relates to the case in which there is a fault-free communication connection to the central monitoring unit 210. In a step 301, the individual decentralized monitoring units 222a, 222b, 223, 224 receive first information from the individual component monitoring units 231a, 231b, 231c, 232a, 232b, 233, 234 and communication monitoring units 242a, 242b, 243, 244 assigned to them. The central monitoring unit 210 also receives first information from the component monitoring units 235 and the communication monitoring unit 245 in the segment 150a. For example, this first information can respectively be notifications from the respective component monitoring units or collected information relating to the data traffic from the respective communication monitoring units.

In a step 302, the individual decentralized monitoring units 222a, 222b, 223, 224 process the respective received first information, for example by preprocessing and filtering this information. In a step 303, the decentralized monitoring units 222a, 222b, 223, 224 transmit this processed information to the central monitoring unit 210 as second information.

In step 304, the central monitoring unit 210 evaluates the second information. Furthermore, the central monitoring unit 210 also evaluates the first information from the component monitoring units 235 and the communication monitoring unit 245 in its own segment 150a. In the course of this evaluation, the central monitoring unit 210 checks whether there is an attack in one or more of the segments 110a, 110b, 110c, 120a, 120b, 130a, 140a, 150a. If this is the case, the central monitoring unit 210 initiates a corresponding countermeasure in step 306. If, in contrast, an attack is not detected, the normal monitoring is continued, indicated by reference sign 305.

FIG. 4 now relates to the case in which the communication connection to the central monitoring unit 210 is interrupted, for example on account of a defect of the network distributor 151.

In this case, in step 401, in a similar manner to step 301, the individual decentralized monitoring units 222a, 222b, 223, 224 receive first information from the individual component monitoring units 231a, 231b, 231c, 232a, 232b, 233, 234 and communication monitoring units 242a, 242b, 243, 244 in their respective segments.

In step 402, the decentralized monitoring units 222a, 222b, 223, 224 each at least partially evaluate their received first information in order to determine whether there is an attack in the respective segments. For example, this evaluation is respectively carried out on the basis of segment-specific models each describing typical first information usually received during fault-free operation.

Furthermore, step 403 checks whether the communication connection to the central monitoring unit 210 has been restored. As long as this is not the case, the decentralized monitoring units 222a, 222b, 223, 224 continue to monitor their segments, indicated by reference sign 404.

If the communication connection has been restored, the individual decentralized monitoring units 222a, 222b, 223, 224 transmit the results of their evaluations, in step 405, to the central monitoring unit 210 which then evaluates these results further. If, for example, an attack in one of the segments has been detected as such a result by one or more of the decentralized monitoring units, the central monitoring unit 210 checks, in step 405, whether this is actually an attack, and initiates appropriate countermeasures.

According to this preferred embodiment of the method according to the disclosure, as shown in FIG. 4, the individual decentralized monitoring units therefore still carry out decentralized local attack detection individually and independently of one another in the individual segments in the case of an interrupted communication connection. This possibility is appropriate, for example, if there is communication at risk of attack between all segments of the industrial network, that is to say if the communication connections between the individual segments are at risk of potential attacks.

According to one preferred embodiment of the method according to the disclosure, provision is made for a predetermined monitoring unit to alternatively or additionally act as a replacement for the central monitoring unit and to at least partially undertake the tasks of the latter in the case of an interrupted communication connection. This possibility is appropriate, for example, if a communication connection between this predetermined monitoring unit and segments on subordinate hierarchical levels is secure and is not or is at least scarcely at risk of attack, whereas a communication connection between the predetermined monitoring unit and hierarchically superordinate segments is exposed to an increased risk of attack.

FIG. 5 now relates to such a case. In this case too, it shall be assumed that the communication connection to the central monitoring unit 210 is interrupted, for example on account of a defect of the network distributor 151. For example, the predetermined monitoring unit 223 in the segment 130a of the supervisory level 130 is predetermined to act as a replacement for the central monitoring unit 210 until the latter can be reached again.

In a manner corresponding to step 401, the individual decentralized monitoring units 222a, 222b, 223, 224 receive, in step 501, first information from the individual component monitoring units 231a, 231b, 231c, 232a, 232b, 233, 234 and communication monitoring units 242a, 242b, 243, 244 in their respective segments.

In step 502, the individual decentralized monitoring units 222a, 222b, 223, 224 process the respective received first information, for example by preprocessing and filtering this information in a manner corresponding to step 302. In step 503, the decentralized monitoring units 222a, 222b, 224 transmit this processed information to the predetermined monitoring unit 223 as second information.

In step 504, the predetermined monitoring unit 223 at least partially evaluates the second information which it has generated itself and the second information from the other decentralized monitoring units 222a, 222b, 224 in order to detect attacks in the segments 110a, 110b, 110c, 120a, 120b, 130a, 140a. This evaluation is effected, in particular, on the basis of segment-specific models describing typical second information relating to the individual segments 110a, 110b, 110c, 120a, 120b, 130a, 140a during fault-free operation.

In a similar manner to step 403, step 505 also checks whether the communication connection to the central monitoring unit 210 has been restored. As long as this is not the case, the decentralized monitoring unit 223 continues its replacement operation, indicated by reference sign 506.

If the communication connection has been restored, the predetermined decentralized monitoring unit 223 transmits, in step 507, the results of its evaluations to the central monitoring unit 210 which evaluates these results further in a similar manner to step 405. If, for example, an attack in one of the segments has been detected as a result, the central monitoring unit 210 checks, in step 507, whether this is actually an attack and initiates appropriate countermeasures.

What is claimed is:

1. A method for monitoring an industrial network having a plurality of network components, comprising:
    dividing the industrial network into a plurality of network segments and into a plurality of hierarchical levels each with a different hierarchical stage, each hierarchical level of the plurality of hierarchical levels including at least one network segment of the plurality of network segments, each network segment of the plurality of network segments including at least one network component of the plurality of network components;
    providing, in each of the plurality of network segments, at least one component monitoring unit configured to monitor the at least one network component in the respective network segment and/or at least one communication monitoring unit configured to monitor communication in the respective network segment;
    providing, in a first network segment of the plurality of network segments, a central monitoring unit configured to evaluate information to detect attacks in the industrial network;
    providing, in at least one second network segment of the plurality of network segments, at least one decentralized monitoring unit;
    assigning the at least one component monitoring unit and/or the at least one communication monitoring unit of each of the plurality of network segments to one of the at least one decentralized monitoring units;
    receiving, with the at least one decentralized monitoring unit, first information from the at least one component monitoring unit and/or the at least one communication monitoring unit assigned to the at least one decentralized monitoring unit;
    while there is a communication connection to the central monitoring unit (i) transmitting second information based on the respective received first information from the at least one decentralized monitoring unit to the central monitoring unit, and (ii) evaluating the second information to detect attacks in the industrial network with the central monitoring unit; and
    while the communication connection to the central monitoring unit is interrupted, at least one of: (i) evaluating the received first information with the at least one decentralized monitoring unit to detect attacks in the industrial network, (ii) transmitting the second information based on the received first information to a predetermined monitoring unit of the at least one decentralized monitoring unit and evaluating the second information in order to detect attacks in the industrial network with the predetermined monitoring unit, and (iii) providing the predetermined monitoring unit of the at least one decentralized monitoring unit on a hierarchically highest hierarchical level to which there is a communication connection.

2. The method according to claim 1, further comprising at least one of:
    evaluating the received first information, generating alarms, and forwarding the generated alarms as the second information using the at least one decentralized monitoring unit;
    processing the received first information and forwarding corresponding processed information as the second information using the at least one decentralized monitoring unit; and
    directly forwarding the received first information as the second information using the at least one decentralized monitoring unit.

3. The method according to claim 1, further comprising:
    transmitting at least one of (i) results of the respective evaluations of the first information by the at least one decentralized monitoring unit and (ii) results of the respective evaluations of the second information by the predetermined monitoring unit for further evaluation, in response to the communication connection to the central monitoring unit being restored after the communication connection to the central monitoring unit was interrupted.

4. The method according to claim 1, further comprising:
    respectively carrying out the evaluation of at least one of the first information the second information to detect attacks in a respective network segment of the plurality of network segments based on a predefined segment-specific model.

5. The method according to claim 4, further comprising:
    generating the predefined segment-specific models by collecting data from the at least one component monitoring unit and/or the at least one communication monitoring unit of the respective network segment of the plurality of network segments; and
    evaluating the data using at least one of statistical analyses, machine learning, and a rule-based system.

6. The method according to claim 5, further comprising:
    generating the predefined segment-specific models after configuring the at least one of the at least one component monitoring unit and the at least one communication monitoring unit of the respective network segment of the plurality of network segments.

7. The method according to claim 1, further comprising:
    configuring the industrial network by:
        introducing the central monitoring unit into the industrial network,
        introducing the at least one decentralized monitoring unit into the industrial network,
        authenticating the at least one decentralized monitoring unit with the central monitoring unit,
        receiving with the at least one decentralized monitoring unit from the central monitoring unit configuration data relating to the at least one component monitoring unit and/or the at least one communication monitoring unit assigned to the at least one decentralized monitoring unit, introducing the at least one component monitoring unit and/or the at least one communication monitoring unit for each segment and authenticating the at least one component monitoring unit and/or the at least one communication monitoring unit for each segment with the at least one decentralized monitoring unit, and configuring the at least one component monitoring unit and/or the at least one communication monitoring unit according to the configuration data using the at least one decentralized monitoring unit.

8. The method according to claim 1, wherein the decentralized monitoring unit is replaced by virtue of removing the decentralized monitoring unit to be replaced from the industrial network, introducing a new decentralized monitoring unit into the industrial network and the new decentralized monitoring unit authenticated by the central monitoring unit, the new decentralized monitoring unit receiving, from the central monitoring unit, the configuration data relating to the assigned at least one component monitoring unit and/or the assigned at least one communication monitoring unit.

9. The method according to claim 1, wherein a computer program is configured to prompt the industrial network to perform the method.

10. The method according to claim 9, wherein the computer program is stored on a machine-readable storage medium.

11. An industrial network comprising:

a plurality of network components, the industrial network being divided into a plurality of network segments and into a plurality of hierarchical levels each with a different hierarchical stage, each hierarchical level of the plurality of hierarchical levels including at least one network segment of the plurality of network segments, each network segment of the plurality of network segments including at least one network component of the plurality of network components;

at least one component monitoring unit and/or at least one communication monitoring unit arranged in each of the plurality of network segments;

a central monitoring unit arranged in a first network segment of the plurality of network segments, the central monitoring unit being configured to evaluate information to detect attacks in the industrial network; and at least one decentralized monitoring unit arranged in at least one second network segment of the plurality of network segments, the at least one component monitoring unit and/or the at least one communication monitoring unit of each of the plurality of network segments being assigned to one of the at least one decentralized monitoring units, wherein the at least one decentralized monitoring unit respectively receives first information from the assigned at least one component monitoring unit and/or the assigned at least one communication monitoring unit, wherein, while there is a communication connection to the central monitoring unit, (i) the at least one decentralized monitoring unit transmits second information, based on the respective received first information, and (ii) to the central monitoring unit evaluates the second information to detect attacks in the industrial network, and wherein, while the communication connection to the central monitoring unit is interrupted, at least one of (i) the at least one decentralized monitoring unit evaluates the received first information to detect attacks in the industrial network, and (ii) the at least one decentralized monitoring unit transmits second information, based on the received first information, to a predetermined monitoring unit of the at least one decentralized monitoring unit, and the predetermined monitoring unit evaluates the second information to detect attacks in the industrial network.

* * * * *